US008330686B2

(12) United States Patent
Shin

(10) Patent No.: US 8,330,686 B2
(45) Date of Patent: Dec. 11, 2012

(54) DRIVING METHOD OF LIQUID CRYSTAL DISPLAY DEVICE

(75) Inventor: Sung-Woo Shin, Chungju-si (KR)

(73) Assignee: LG Display Co. Ltd., Seoul (KR)

( * ) Notice: Subject to any disclaimer, the term of this patent is extended or adjusted under 35 U.S.C. 154(b) by 767 days.

(21) Appl. No.: 11/480,196

(22) Filed: Jun. 30, 2006

(65) Prior Publication Data

US 2007/0080924 A1 Apr. 12, 2007

(30) Foreign Application Priority Data

Oct. 11, 2005 (KR) ........................ 10-2005-0095212

(51) Int. Cl.
*G09G 3/36* (2006.01)
*G09G 5/00* (2006.01)
*G06F 3/038* (2006.01)
*G06F 1/00* (2006.01)

(52) U.S. Cl. .......... 345/87; 345/211; 345/212; 345/204; 345/213; 713/300; 713/330

(58) Field of Classification Search .............. 345/60–72, 345/87–107, 204–699; 710/8–14, 260–269; 713/100, 300–340
See application file for complete search history.

(56) References Cited

U.S. PATENT DOCUMENTS 5,790,096 A * 8/1998 Hill, Jr. ......................... 345/600
5,793,241 A * 8/1998 Sanzo et al. .................. 327/323
6,397,338 B2 * 5/2002 Shay ............................. 713/300
6,414,855 B1 * 7/2002 Yasuda ........................... 363/19
6,621,489 B2 * 9/2003 Yanagisawa et al. ......... 345/211
2003/0179221 A1 * 9/2003 Nitta et al. .................... 345/690
2005/0156854 A1 * 7/2005 Park et al. ..................... 345/100

OTHER PUBLICATIONS

"SED1375 Technical Manual", 1999, Epson Research and Develoment, Inc., Hardware Functional Specification p. 90 & 91, Programming Notes and Examples p. 35 & 36.*
"SED1375 Technical Manual", 1999, Epson Research and Development, Inc., Hardware Functional Specification p. 90 & 91, Programing Notes and Examples p. 35 & 36.*

* cited by examiner

*Primary Examiner* — Sumati Lefkowitz
*Assistant Examiner* — David Tung
(74) *Attorney, Agent, or Firm* — Brinks Hofer Gilson & Lione

(57) ABSTRACT

A liquid crystal display device includes a liquid crystal panel, a driving circuit and a backlight unit supplying light to the liquid crystal panel. The liquid crystal display device further includes a power management unit. The driving circuit includes a plurality of sub-circuits. The power management unit may provide a common voltage to the driving circuit and the backlight unit. A driving method of the liquid crystal display device includes halting an image display operation of a liquid crystal panel in response to a change of an operation mode. The driving method further includes sequentially changing operations of the plurality of sub-circuits.

10 Claims, 6 Drawing Sheets

DRIVING METHOD OF LIQUID CRYSTAL DISPLAY DEVICE

The present invention claims the benefit of Korean Patent Application No. 2005-0095212, filed in Korea on Oct. 11, 2005, which is hereby incorporated by reference in its entirety.

BACKGROUND

1. Technical Field

The present invention relates to a method of driving a liquid crystal display device. More particularly, the present invention relates to a method of driving a liquid crystal display device with reduced voltage/current changes in response to a change of operating modes.

2. Related Art

Flat panel displays, such as liquid crystal display (LCD) devices, plasma display panels (PDP), field emission displays and electro-luminescence displays (ELD), replace displays using cathode ray tubes. In particular, LCD devices are in demand because LCD devices provide several advantages, such as a high resolution, a light weight, a thin profile, a compact size, and low power supply requirements.

LCD devices include two substrates that are spaced apart and face each other with a liquid crystal material interposed between the two substrates. The two substrates include electrodes that face each other. A voltage applied between the electrodes induces an electric field across the liquid crystal material. Light transmissivity of LCD devices may change by adjusting the intensity of the induced electric field, which may result in alignment change of liquid crystal molecules in the liquid crystal material. Thus, LCD devices display images by varying the intensity of the induced electric field.

LCD devices include a liquid crystal panel, a driving circuit and a backlight unit. The driving circuit provides data signals and control signals to the liquid crystal panel. The backlight unit provides light to the liquid crystal panel. LCD devices may include a power management unit that supplies voltages to the driving circuit and the backlight unit. The backlight unit and the driving circuit may be supplied with a voltage in common. The driving circuit may have different loads if an operating mode of LCD devices is changed. For example, an LCD device may operate in a normal display mode and may be changed to a reset mode, a standby mode, or a sleep mode. This change of modes may cause the load of the driving circuit to be changed. This load change may cause the backlight unit sharing the same voltage to have an abnormal voltage level. In particular, the load change may result from a plurality of capacitors. The driving circuit may include a DC-DC converter as one of its sub-circuits. The DC-DC converter generates DC voltages having various levels. The DC-DC converter includes the plurality of capacitors. When the operating mode is changed and each sub-circuit may stop to operate, the capacitors in the DC-DC converter may discharge charges simultaneously. Accordingly, charges discharged from the capacitors may flow to the backlight unit. As a result, the backlight unit may be supplied with higher voltages.

FIG. 1 is a graph illustrating abrupt voltage/current changes applied to a backlight unit in an LCD device. As shown in FIG. 1, an operating mode is changed at Timing T1. A voltage supplied to the backlight unit is level-jumped for an interval T2. A current I flowing in the backlight unit is changed abruptly for the interval T2. This abnormal current change may be caused by the load change in the driving circuit. As noted above, the load change results from the change of the operating mode. This abnormal current change may reduce life span of elements contained in the backlight unit. Further, a user may perceive a flicker on a display screen due to the increased brightness. Accordingly, there is a need of a driving method of a liquid crystal display device that minimizes abnormal voltage or current changes applicable to backlight units.

SUMMARY

A driving method of a liquid crystal display device is provided. The liquid crystal display device comprises a driving circuit, a liquid crystal panel and a backlight unit supplying light to the liquid crystal panel. The driving circuit and the backlight unit are supplied with a common voltage. The driving method comprises halting an image display operation of the liquid crystal panel in response to a change of an operating mode; and sequentially changing operations of a plurality of sub-circuits. The driving circuit includes the plurality of sub-circuits.

A liquid crystal display device comprises a liquid crystal panel operating in a plurality of operating modes, a driving circuit and a backlight unit. The driving circuit includes a plurality of sub-circuits. The backlight unit supplies light to the liquid crystal panel and shares a common voltage with the driving circuit. The liquid crystal panel halts an image display operation in response to a change of the operating modes. The sub-circuits sequentially change operations.

DETAILED DESCRIPTION OF EXEMPLARY EMBODIMENTS

Reference will now be made in detail to exemplary embodiments, which are illustrated in the accompanying drawings. Wherever possible, the same reference numbers will be used throughout the drawings to refer to the same or like parts.

Figure 1:
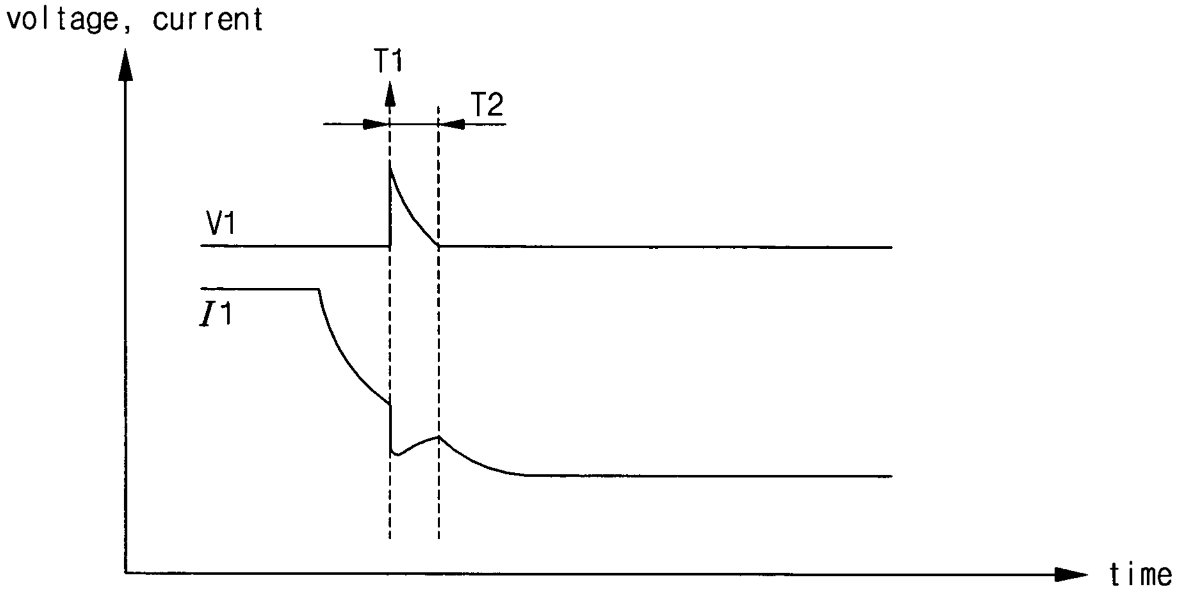
FIG. 1 RELATED ART
FIG. 1 is a graph illustrating voltage/current changes applied to a backlight unit in the related art LCD device.
Figure 2:
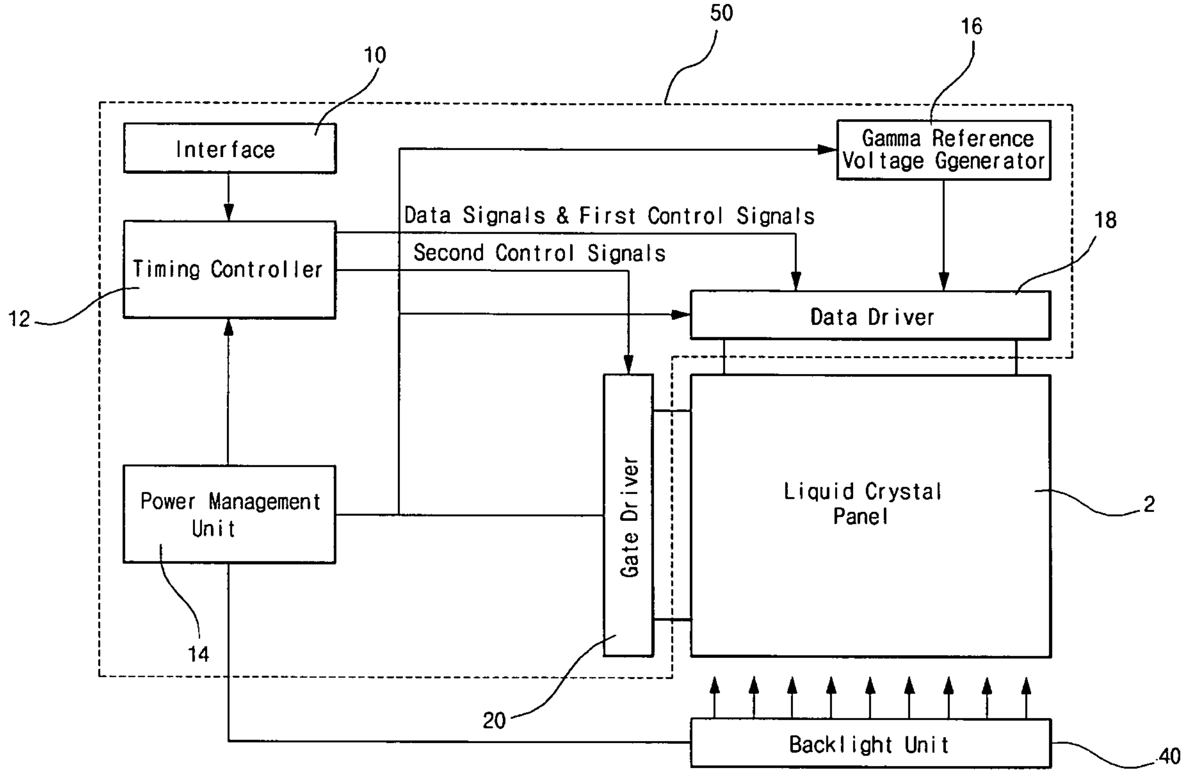
FIG. 2 is a schematic block diagram of an LCD device.
Figure 3:
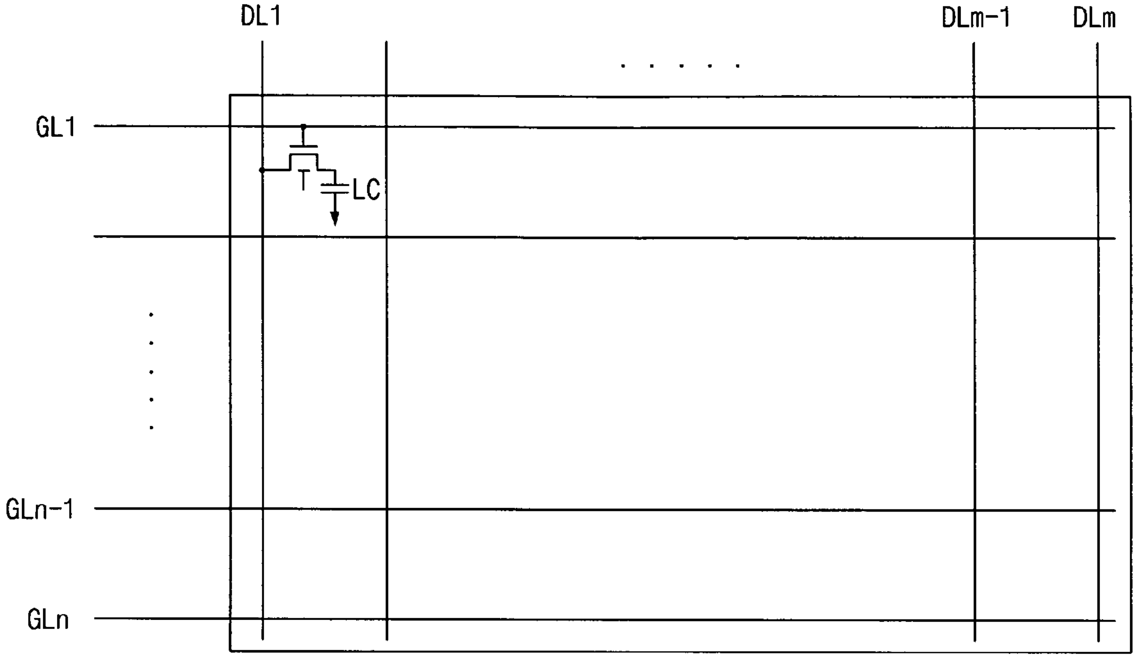
FIG. 3 illustrates a liquid crystal panel of FIG. 2.

FIG. 2 is a block diagram of an LCD device, and FIG. 3 illustrates in detail a liquid crystal panel of FIG. 2. As shown in FIGS. 2 and 3, the LCD device 50 includes a liquid crystal panel 2, a driving circuit block 50 and a backlight unit 40. The liquid crystal panel 2 includes a plurality of gate lines GL1 to GLn and a plurality of data lines DL1 to DLm, as shown in FIG. 3. The gate lines GL1 to GLn and the data lines DL1 to DLm intersect each other to define a plurality of pixel regions. In each pixel region, a thin film transistor T is connected to the corresponding gate and data lines as shown in FIG. 3. A liquid crystal capacitor LC is connected to the thin film transistor T.

In FIG. 2, the driving circuit block 50 includes an interface 10, a timing controller 12, a power management unit 14, a gamma reference voltage generator 16, a data driver 18 and a gate driver 20. The timing controller 12 generates control signals to control the data driver 18 and the gate driver 20 based on control signals supplied from the interface 10, such as a vertical synchronizing signal, a horizontal synchronizing signal and a data enable signal. The timing controller 12 supplies data signals to the data driver 18.

Data signals and control signals are provided to the liquid crystal panel 2 through the data driver 18 and the gate driver 20. The data signals include R, G and B data signals. First control signals are provided from the timing controller 12 to the data driver 18. Second control signals are provided from the timing controller 12 to the gate driver 20. The control signals may be provided from an outer driving system such as a personal computer to the interface 10 and the interface 10 supplies such signals to a timing controller 12.

The gamma reference voltage generator 16 generates a plurality of gamma reference voltages to the data driver 18. The data driver 18 includes a digital-to-analog converter (DAC). The data driver 18 generates data voltages using the gamma reference voltages. The data voltages are supplied to the data lines DL1 to DLm as shown in FIG. 3. The gate driver 20 sequentially enables the plurality of gate lines GL1 to GLn as shown in FIG. 3. The thin film transistors T are sequentially turned on as each of the gate lines GL1 to GLn is enabled. When the thin film transistors T connected to one of the gate lines GL1 to GLn are turned, the data voltages are supplied to the liquid crystal capacitor LC through the data lines DL1 to DLm.

The backlight unit 40 supplies light to the liquid crystal panel 2. The backlight unit 40 uses at least one lamp or a plurality of light emitting diodes. The power management unit 14 supplies various voltages to operate components of the LCD device 50. In other embodiment, some components may be supplied with the same voltage from the power management unit 14.

Figure 4:
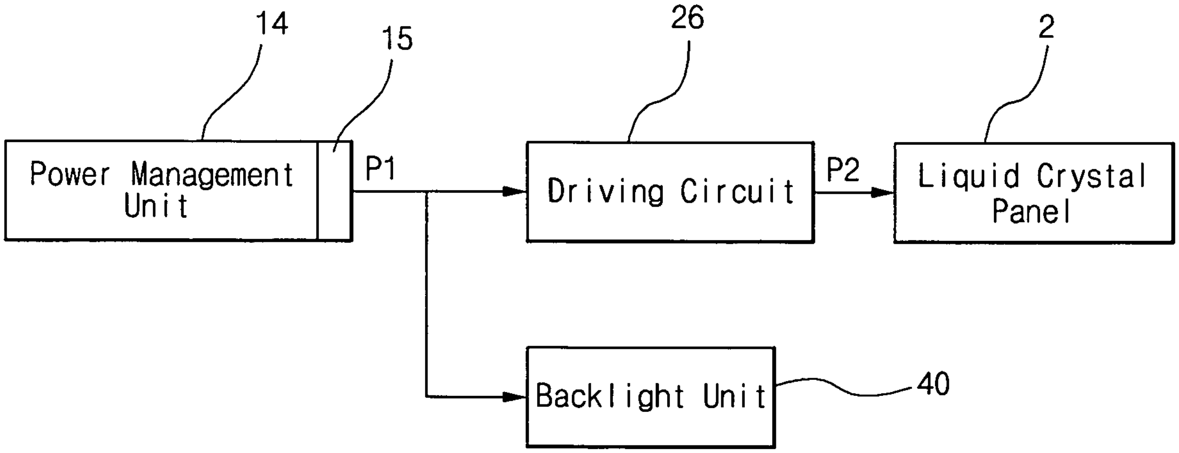
FIG. 4 is a block diagram illustrating a power supply path of the LCD device as shown in FIG. 2.
Figure 5:
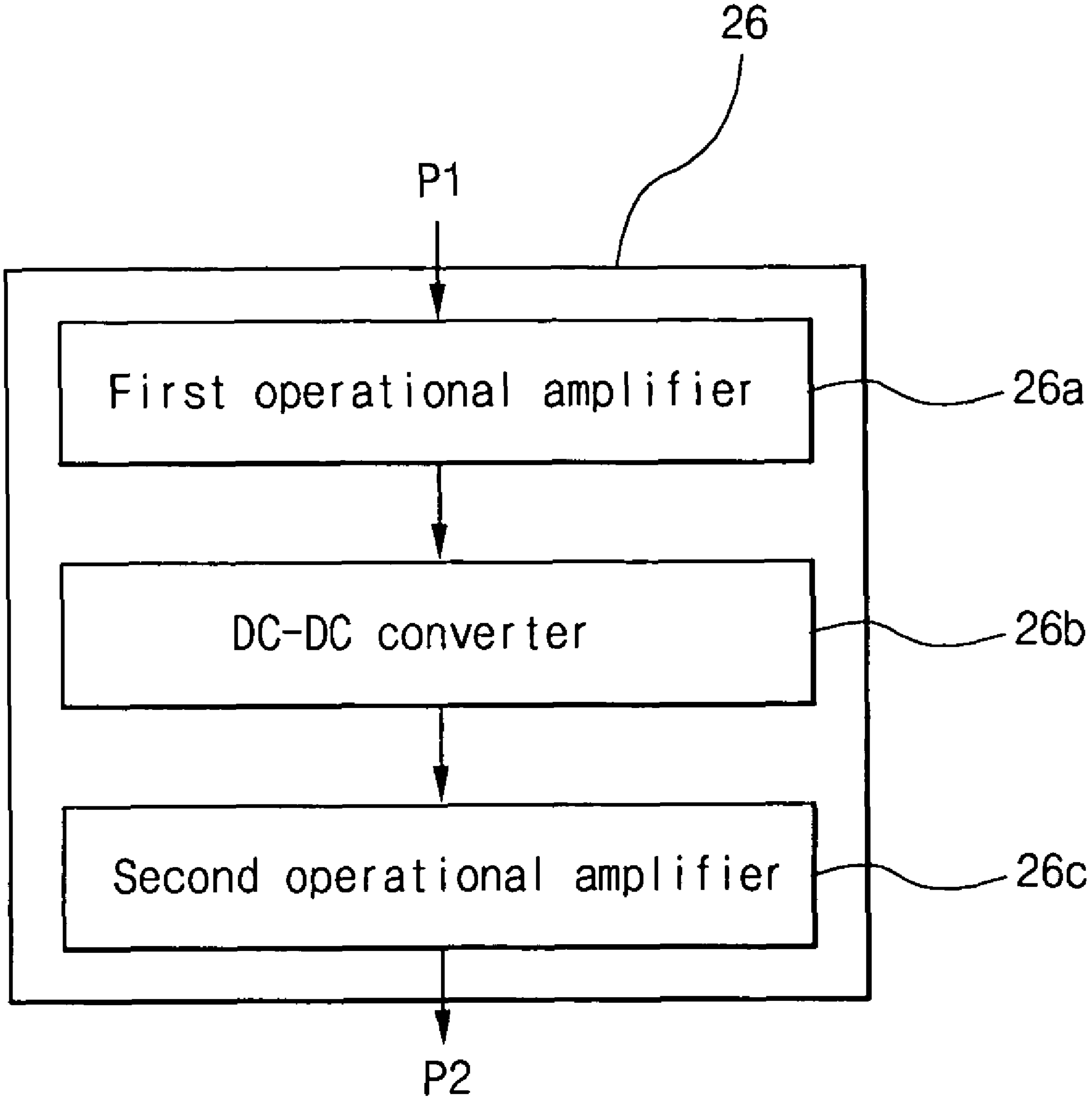
FIG. 5 is a schematic view of sub-circuits in a driving circuit of FIG. 4.

FIG. 4 is a block diagram illustrating a power supply path according to one embodiment. FIG. 5 is a schematic view of sub-circuits in a driving circuit 26. As shown in FIGS. 4 and 5, a power management unit 14 supplies a first voltage P1 from a power supply terminal 15 to both the driving circuit 26 and the backlight unit 40. The arrangement of sharing a common voltage by a driving circuit and a backlight unit may be known in the related art. The liquid crystal panel 2 is supplied with a second voltage P2 through the driving circuit 26. The driving circuit 26 may be the data driver 18 and/or the gate driver 20. The first voltage P1 is level-adjusted in the driving circuit 26 to generate the second voltage P2, and the second voltage P2 is subsequently supplied to the liquid crystal panel 2. In the exemplary embodiment, the driving circuit 26 may include the data driver 18 and the gate driver 20.

The driving circuit 26 includes a plurality of sub-circuits. In this embodiment, the sub-circuits include a first operational amplifier (OP-Amp) 26*a*, a DC-DC converter 26*b* and a second operational amplifier (OP-Amp) 26*c*. In other embodiment, the sub-circuits may include other circuits. The first operational amplifier 26*a* is supplied with and amplifies the first voltage P1. The DC-DC converter 26*b* is supplied with the amplified first voltage P1 and generates a second voltage P2 as well as a plurality of voltages having different levels. For this reason, the DC-DC converter 26*b* includes a plurality of capacitors. The second operational amplifier 26*c* amplifies and outputs voltages and supplies the amplified second voltage P2 to the liquid crystal panel 2.

The backlight unit 40 includes at least one lamp or a plurality of light emitting diodes to supply light to the liquid crystal panel 2. As explained above, the driving circuit 26 and the backlight unit 2 may use the same first voltage P1 in common. When an operating mode is changed, a load change in the driving circuit 26 may be minimized and the first voltage supplied to the backlight unit 40 may not be jumped, as will be explained in detail below in conjunction with FIG. 6.

Figure 6:
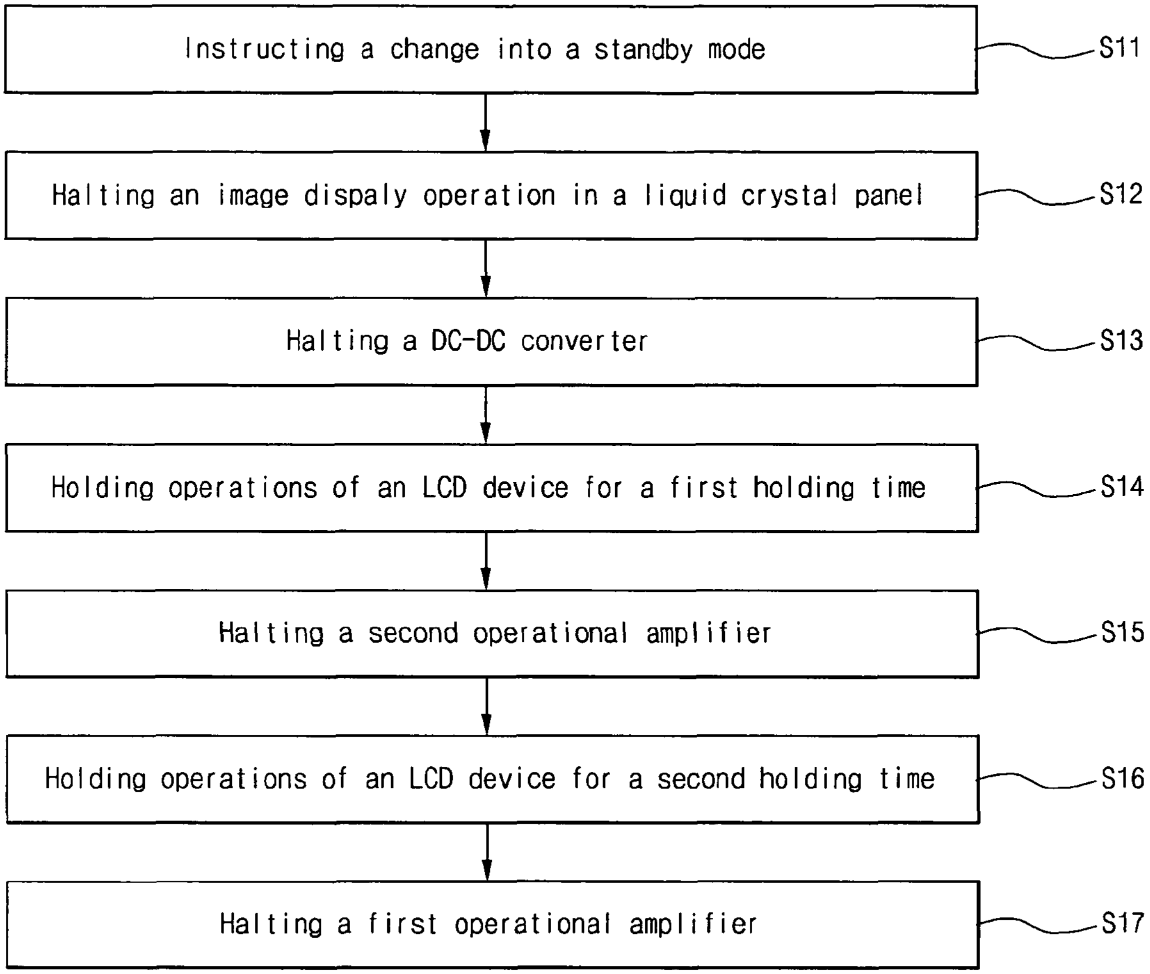
FIG. 6 is a flow chart illustrating a driving method of the LCD device of FIGS. 4 and 5 when a normal display mode is changed into different operating modes.

FIG. 6 is a flowchart illustrating a driving method of the LCD device of FIG. 2 when a normal display mode is changed into different operating modes. The different operating modes may include a standby mode or a sleep mode. As shown in FIG. 6, an operating mode of the LCD device is changed from a normal display mode into a standby mode or a sleep mode, respectively (S11). A control unit, although not shown, generates "an operating mode change instruct" to change the operating mode (S11).

At S12, before the driving circuit 26 of FIG. 4 is operated in the changed operating mode, a voltage supply for the liquid crystal panel 2 halts. The liquid crystal panel 2 is changed from an on-state into an off-state. In other words, an image display operation of the liquid crystal panel 2 halts.

The DC-DC converter 26*b* as shown in FIG. 5 has a plurality of capacitors charged with charges. At S13, the operation of the DC-DC converter 26*b* halts. To discharge charges in the capacitors, a permissible output current value of first and second operational amplifiers 26*a* and 26*c* may be maximized at the same time or before the operation of the DC-DC converter 26*b* halts.

At S14, all operations of components in the LCD device are placed in a "hold" state for a first holding time. The first holding time relates to a discharging time of the capacitors. The operations of the LCD device are held for the first holding time such that the capacitors of the DC-DC converter 26*b* discharge charges. The first holding time may range from several tens milliseconds to several hundreds milliseconds. By way of example only, the first holding time may range between 50 milliseconds and 200 milliseconds. The first holding time may be adjustable.

At S15, the operation of the second operational amplifiers 26*c* of FIG. 5 halts. At S16, all operations of components in the LCD device are placed in a "hold" state again for a second holding time. The second holding time may be several tens milliseconds to several hundreds milliseconds. The second holding time may be similar to the first holding time. Alternatively, the second holding time may be less than the first holding time.

At S17, the operation of the first operational amplifier 26*a* of FIG. 5 halts. In this embodiment, the operation of the second operational amplifier 26*c* halts prior to that of the first operational amplifier 26*a*. In other embodiments, the first operational amplifier 26*a* may stop operating prior to the second operational amplifier 26*c*.

As explained above, when the operation mode is changed, the operations of the sub-circuits in the driving circuit sequentially halt for predetermined holding times. Accordingly, the load change of the driving circuit may be minimized. The level change of the voltage supplied to the backlight unit may be minimized. The change of the operating mode may not result in an abrupt change of the voltage supplied to the backlight unit. Likewise, a current flowing in the backlight unit may not experience abrupt change.

In the above embodiments, the driving circuit and the backlight unit share the same voltage. The driving method described above may not be limited to the driving circuit and the backlight unit in LCD devices. The driving method may be applicable to at least two components that share the same voltage in LCD devices. The driving method may be applicable to other display devices than LCD devices.

It will be apparent to those skilled in the art that various modifications and variations may be made in the driving method of the liquid crystal display device without departing from the spirit or scope of the invention. Thus, it is intended that the present invention cover the modifications and variations provided they come within the scope of the appended claims and their equivalents.

What is claimed is:

1. A method of driving a liquid crystal display device comprising a data driver, a liquid crystal panel and a backlight unit supplying light to the liquid crystal panel, the method comprising:

supplying a common voltage to the data driver and the backlight unit;

turning off the liquid crystal panel by supplying no voltage for the liquid crystal panel in response to a change of an operating mode; and sequentially halting operations of a plurality of sub-circuits after turning off the liquid crystal panel, wherein the plurality of sub-circuits includes a first operational amplifier, a DC-DC converter and a second operational amplifier, which are sequentially connected in series, and wherein sequentially halting operations of the plurality of sub-circuits comprise:

halting an operation of the DC-DC converter;

holding an operation of the liquid crystal display device for a first holding time after halting the operation of the DC-DC converter;

halting an operation of the second operational amplifier after holding the operation of the liquid crystal display device for the first holding time;

holding the operation of the liquid crystal display device for a second holding time after halting the operation of the second operational amplifier; and halting an operation of the first operational amplifier after holding the operation of the liquid crystal display device for the second holding time.

2. The method of claim 1, further comprising maximizing a permissible output current value of the first and second operational amplifiers when halting the operation of the DC-DC converter.

3. The method of claim 1, further comprising maximizing a permissible output current of the first and second operational amplifiers before halting the operation of the DC-DC converter.

4. A method of driving a liquid crystal display device having a liquid crystal panel, a first unit and a second unit, comprising:

supplying a common voltage to the first and second units;

turning off the liquid crystal panel by supplying no voltage for the liquid crystal panel in response to a change of an operating mode; and sequentially halting operations of a plurality of sub-circuits contained in the first unit, after turning off the liquid crystal panel, such that a load of the first unit is maintained at the time of the change of the operating mode, wherein the plurality of sub-circuits includes a first operational amplifier, a DC-DC converter and a second operational amplifier, which are sequentially connected in series, and wherein sequentially halting operations of the plurality of sub-circuits comprise:

halting an operation of the DC-DC converter;

holding an operation of the liquid crystal display device for a first holding time after halting the operation of the DC-DC converter;

halting an operation of the second operational amplifier after holding the operation of the liquid crystal display device for the first holding time;

holding the operation of the liquid crystal display device for a second holding time after halting the operation of the second operational amplifier; and halting an operation of the first operational amplifier after holding the operation of the liquid crystal display device for the second holding time.

5. A liquid crystal display device, comprising:

a liquid crystal panel operating in a plurality of operating modes;

a data driver comprising a plurality of sub-circuits including a first operational amplifier, a DC-DC converter and a second operational amplifier, which are sequentially connected in series; and a backlight unit supplying light to the liquid crystal panel and sharing a common voltage with the driving circuit;

wherein the liquid crystal panel is turned off by supplying no voltage for the liquid crystal panel in response to a change of the operating modes and then operations of the sub-circuits sequentially halt such that an operation of the liquid crystal display device is held for a first holding time after an operation of the DC-DC converter halts, an operation of the second operational amplifier halts after the operation of the liquid crystal display device is held for the first holding time, the operation of the liquid crystal display device is held for a second holding time after the operation of the second operational amplifier halts, and an operation of the first operational amplifier halts after the operation of the liquid crystal display device is held for the second holding time.

6. The liquid crystal display device of claim 5, wherein each of the first and second holding times ranges between 50 milliseconds and 200 milliseconds.

7. The liquid crystal display device of claim 5, wherein the DC-DC converter includes a plurality of capacitors and the capacitors discharge predetermined charges in response to the change of the operating modes.

8. The liquid crystal display device of claim 5, wherein an operation of the DC-DC converter halts in response to the change of the operating modes before the operation of the second operational amplifier halts.

9. The liquid crystal display device of claim 5, wherein a permissible output current value of the first and second operational amplifiers is maximized when the operation of the DC-DC converter halts.

10. The liquid crystal display device of claim 5, wherein the backlight unit comprises at least one lamp or a plurality of light emitting diodes.

* * * * *

UNITED STATES PATENT AND TRADEMARK OFFICE

CERTIFICATE OF CORRECTION

PATENT NO. : 8,330,686 B2
APPLICATION NO. : 11/480196
DATED : December 11, 2012
INVENTOR(S) : Shin It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 893 days.

Signed and Sealed this
Eleventh Day of November, 2014

Michelle K. Lee
*Deputy Director of the United States Patent and Trademark Office*